United States Patent

[11] 3,525,365

| [72] | Inventors | John W. Meulendyk<br>Kalamazoo, Michigan;<br>Robert F. Boyle, Parchment, Michigan |
|---|---|---|
| [21] | Appl. No. | 587,137 |
| [22] | Filed | Oct. 17, 1966 |
| [45] | Patented | Aug. 25, 1970 |
| [73] | Assignee | Pneumo Dynamics Corporation<br>Cleveland, Ohio, a corporation<br>of Delaware |

[54] EXPANSION PLUG
7 Claims, 8 Drawing Figs.

[52] U.S. Cl. ..................................................... 138/89,
151/31, 215/52, 220/24.5
[51] Int. Cl. ..................................................... F16l 55/12,
B65d 39/12
[50] Field of Search ............................................ 138/89, 98;
220/24A, 24.5; 215/52; 85/72, 82, 83; 151/31

[56] References Cited
UNITED STATES PATENTS

| 778,068 | 12/1904 | Peterson ........................ | 189/89X |
| 1,050,557 | 1/1913 | McLaughlin .................. | 220/24.5X |
| 2,821,323 | 1/1958 | Lee ............................... | 220/24.5 |
| 2,900,863 | 8/1959 | Maynard ....................... | 151/31X |
| 3,078,002 | 2/1963 | Rodgers ........................ | 85/72X |
| 3,156,373 | 11/1964 | Willis ............................ | 138/89X |
| 3,365,093 | 1/1968 | Malenke ....................... | 220/24.5 |

FOREIGN PATENTS

| 106,150 | 5/1917 | Great Britain ............ | 138/89 |
| 115,169 | 5/1918 | Great Britain ............ | 138/89 |
| 9,047 | 1902 | Great Britain ............ | 138/89 |
| 545,645 | 3/1932 | Germany ................... | 220/24.5 |

Primary Examiner— Herbert F. Ross
Attorney— Stephen M. Mihaly

ABSTRACT: A pre-assembled cylindrical plug with a tapered bore and expander to be placed in the end of a passage or opening and fixed by holding an end of the plug while pulling outwardly on the expander, the latter having a stem for such pulling which is removed by breaking at an inner end. The plug can have adjusting screw extension which adjustably threaded in a body part and then locked by the expansion of the plug.

Patented Aug. 25, 1970

INVENTORS
JOHN W. MEULENDYK
ROBERT F. BOYLE
BY
*Stephen M. Mihaly*
ATTORNEY

EXPANSION PLUG

This invention relates to expansion plug devices of the type used to close and preferably seal passages and openings in hydraulic and pneumatic housings, for example, for valves, and other parts.

Sealing plugs for such applications have long been available in many different designs of varying complexity, with a simple and widely used form comprising a sleeve insert closed at one end and having a tapered inner surface and a correspondingly tapered locking member to be driven into the sleeve to expand the latter radially into sealing engagement with the passage. The sleeve member of this plug has to be restrained or held in the passage against moving inwardly, since the locking member exerts an axial force as well as the radial expanding force on the sleeve, and it has thus been common in the use of this sealing plug to enlarge the end of the passage and thus provide a stop shoulder for engagement by the inner end of the sleeve member. There are, however, some applications which for various reasons cannot be modified to provide this stop action, for example, in the case of an opening in a thin-walled housing and the like.

It is a primary object of this invention to provide a sealing plug which is of comparable simplicity in design and ease of use but does not require any internal or interior coaction with respect to the opening to be sealed thereby in order to effect the radial expansion of the device therewithin.

It is also an object of the present invention to provide such an improved expansion plug device having only two components, an expanding plug member and a locking member, which are inserted in assembled form within the opening or passage to be sealed and then actuated for the desired expansion entirely from the same side or the position of insertion.

It is also an object of the invention to provide an expansion plug device in which the plug member is formed with an externally threaded portion to serve, for example, as an adjusting screw which can be locked substantially permanently in place after being threaded to the desired position of adjustment. With suitable formation of the expanding portion of such member, cooperating with the locking member, this device thus provides a locked and sealed screw adjustment for machine parts and the like.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
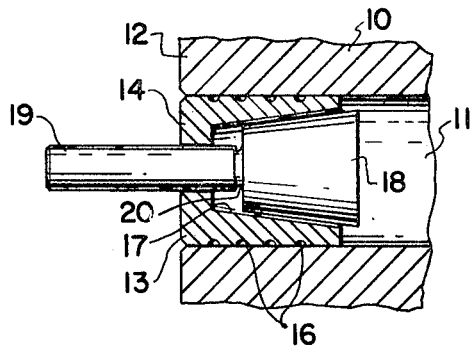
FIG. 1 is a fragmentary cross-section of a housing having an opening in which an expansion plug in accordance with this invention has been positioned and is ready for locking.

Referring now to the drawings in detail, reference numeral 10 designates a section of a valve housing or the like in which there is an opening or passage 11 to be closed and sealed. For this purpose, an expansion plug according to the invention is inserted in the passage from the outside of the housing, the outer surface being designated by reference numeral 12, and this plug comprises a sleeve member 13 open at one end and having at the other end an integral wall 14 in which a relatively small central passage 15 is provided.

The outer periphery of the sleeve is preferably formed with a series of longitudinally spaced annular grooves 16, with resulting intervening lands, and the inner wall surface 17 of the sleeve is tapered or frusto-conical, with the largest internal diameter at the open end of the sleeve member. This member is adapted for placement in the tubular passage, the normal external diameter of the former being approximately the same as the passage diameter, with the end wall 14 outermost and approximately in the plane of the outer surface 12 of the housing.

Before such placement of the sleeve member 13 in the passage 11, however, a locking member having a head 18 of frusto-conical shape and a stem 19 extending from the smaller diameter end of the head is assembled with the plug member in the manner illustrated. The taper of the locking member head 18 corresponds to that of the inner surface 17 of the plug member and the noted assembly is of course accomplished by loosely fitting the locking member in the plug member with the stem projecting outwardly through the opening 15 in the end wall 14 of the plug member.

Figure 2:
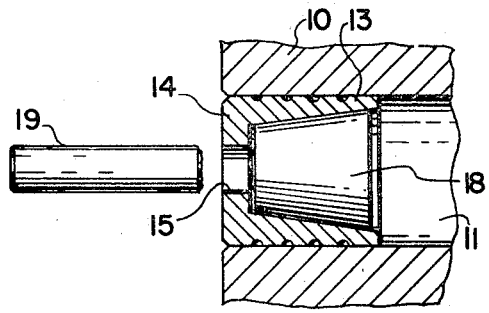
FIG. 2 is a similar section in which the plug is shown in the actuated or locked condition.

With the plug thus positioned as shown in FIG. 1, an outward pull is exerted in any suitable manner on the stem 19 of the locking member while a holding force is applied against the end wall 14 of the plug member, and the forcible pulling of the head 18 of the locking member into the plug member 13 of course causes the latter to be radially expanded and its outer surface swaged into sealing engagement with the passage. The stem 19 is peripherally undercut immediately adjacent the head, 18, as shown at 20, and after the device has been expanded into the locked and sealed condition shown in FIG. 2, the stem can be twisted or deflected for breaking at the thus weakened section as also shown in this view. The sealed plug 13 is accordingly flush with the outer surface of the housing, and the opening through which the stem originally extends and is withdrawn is sealed by the wedging interengagement of the inner surface of the plug member and the head of the locking member.

Figure 3:
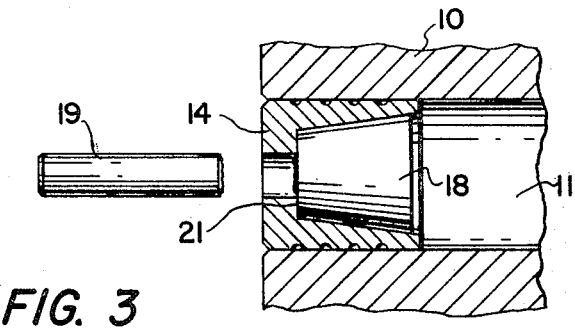
FIG. 3 is substantially the same as FIG. 2 with a slightly different locking condition illustrated.

An additional interior sealing face can be provided, if desired, by forming the plug and locking members to permit the latter to be forced outwardly sufficiently into sealing engagement with the end wall 14 as well, with this locked condition being shown in FIG. 3 in which the thus formed added sealing interface is designated by reference numeral 21.

Figure 4:
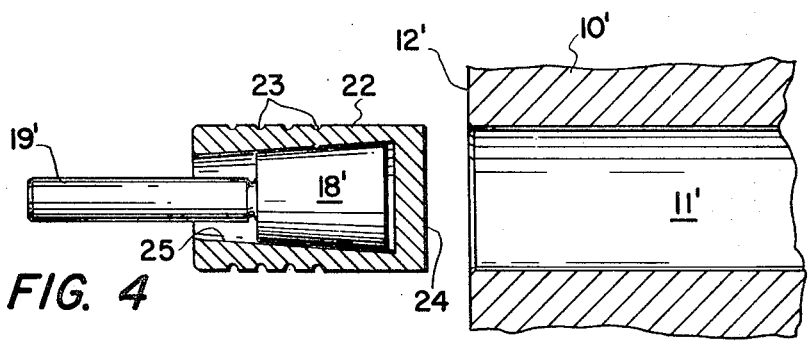
FIG. 4 illustrates in cross-section another embodiment of the new plug in spaced association with a fragmented housing section.
Figure 5:
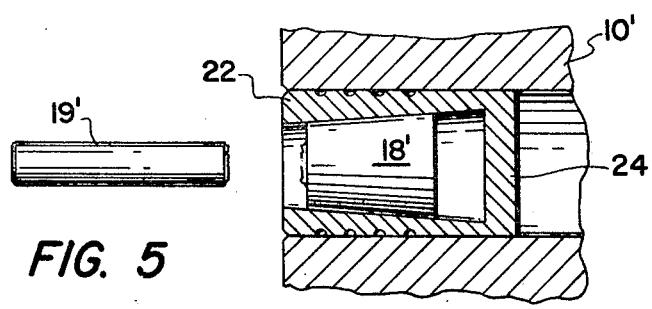
FIG. 5 shows the plug embodiment of FIG. 4 in the locked condition within the housing section.

The modified form of the expansion plug device shown in FIGS. 4 and 5 can be used in the same manner and comprises a similar locking member as shown by the primed reference numerals. The plug member 22 is, however, of different design. This modified component is also a sleeve open at one end, with annular peripheral grooves 23, an end wall 24, and a tapered interior surface 25. In this form the end wall 24 is imperforate and the largest internal diameter is at such end. The locking member 18', 19' is assembled with this plug member by suitably forming the latter or bringing it to a relatively expanded condition to permit the insertion of the locking member with its larger end innermost and then bringing or returning the wall of the plug member to the shape illustrated with the outer surface cylindrical and the inner surace tapered. The thus assembled device is inserted in the passage 11' with the open end of the plug member outermost and approximately in the plane of the outer surface 12' of the housing 10', and the locking member 18', 19' is again pulled outwardly while the plug member 22 is externally restrained from withdrawal, thereby to effect the radial expansion which seals the member 22 in the passage. In this embodiment of the invention, the passage is closed by the integral end wall 24 of the plug member and the only sealing required is along the expanded periphery of the latter.

Figure 6:
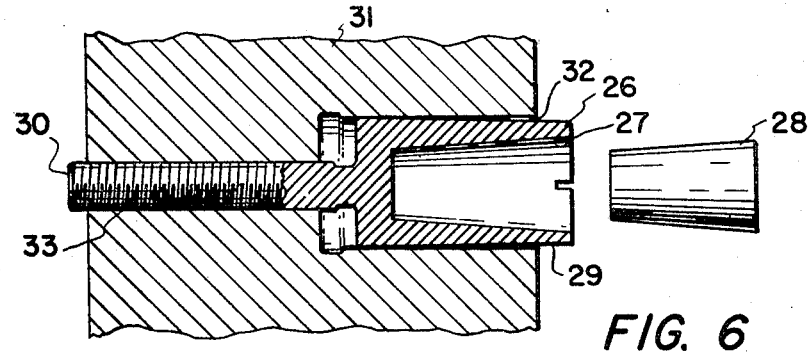
FIG. 6 is a cross-sectional view of an adjusting screw form of the expansion plug device of the invention wherein the device is in adjusted position within a part but not locked.
Figure 7:
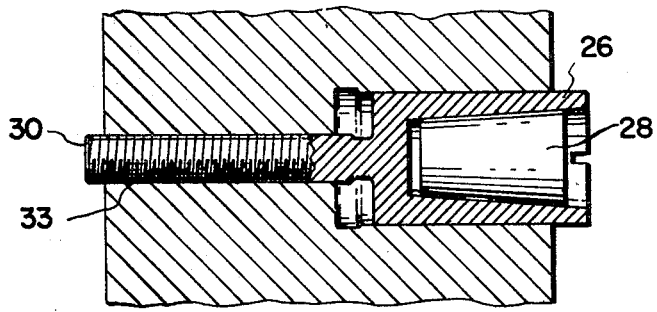
FIG. 7 shows the assembly of FIG. 6 with the plug locked.

The adjusting screw form of expansion plug device shown in FIGS. 6 and 7 comprises in this particular embodiment a plug member which is in part of more conventional form in that it comprises a sleeve portion 26 with a tapered bore 27 the smaller end of which is innermost. A separate expander 28 of a simple frusto-conical shape is provided for driving into the sleeve portion 26, the outer surface 29 of which is also shown as having a slight taper for outward reduction in diameter. This plug member is, however, distinguished by an integral externally threaded extension 30 at the outer center of the end wall of the sleeve portion 26. Reference numeral 31 is intended to represent a machine part and the like having a cylindrical recess 32 and a threaded opening 33 extending centrally from the bottom of the recess through to the opposite side of the part. The plug device is inserted in the recess 32, which is of generally corresponding diameter, and advanced by threading of the extension 30 in the part opening 33, for example, to provide a predetermined projection of the end of this extension beyond the inner face. When the desired projection is thus provided, the locking part 28 is forcibly driven into the bore 27 radially to expand the sleeve portion into locking and preferably sealing engagement with the wall of the recess, whereby a locked and sealed screw adjustment is established by the device.

Figure 8:
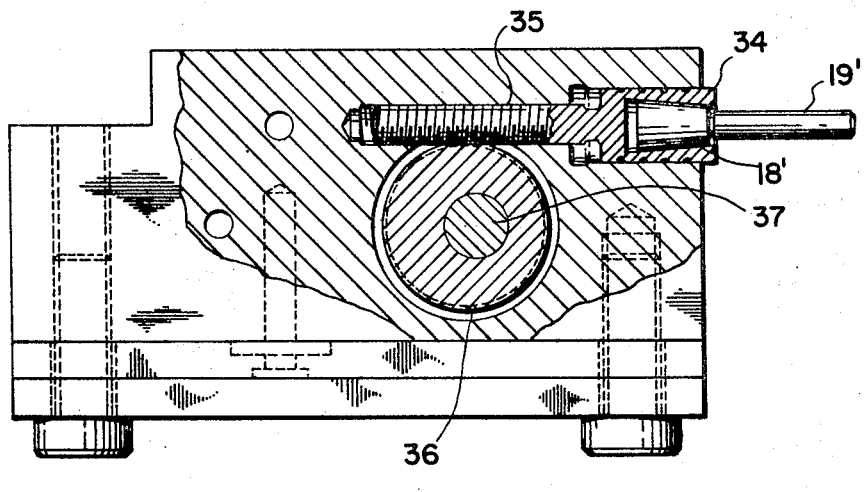
FIG. 8 is a view partly in elevation and partly in section of a clamp assembly in which an adjusting screw form of the new expansion plug device is incorporated.

A more complete illustration of an application of such screw form of the expansion plug device is shown in FIG. 8, wherein the device itself is also somewhat modified in that the plug or sleeve section 34 is similar to that shown in the embodiment of FIGS. 4 and 5, with a cooperable locking member 18', 19' as also there shown. In this illustration, the screw section 35 serves as a worm coacting with a gear 36 on an eccentric shaft 37, and the expansion plug is first threaded to effect a desired degree of angular displacement of the shaft, for example, in a clamping function, and the integral sleeve portion 34 is then locked and sealed by actuation of the locking member in the same manner as set forth in the description of FIGS. 4 and 5.

It will of course be appreciated that the special threaded forms of the expansion plug have very wide and general utility as adjusting screws and wherever applicable provide positive and, for practical purposes, permanent locking in the particular selected condition of adjustment.

We claim:

1. An expansion plug device for closing an opening in a body at an outer surface in which the opening occurs, comprising a plug member for insertion in such opening with an end of said member exposed adjacent said surface, said plug member being in the form of a sleeve open at one end and having a wall at the other end, with the outer surface of the sleeve being cylindrical and the inner surface being tapered and decreasing in diameter along its length in the direction of the exposed end of the inserted member, a locking member having a tapered head slidable within the plug member for wedge expansion of the same in the opening when the plug member is restrained at its exposed end and the locking member is pulled outwardly therewithin, the locking member further having a stem part which projects from the plug member and is accessible outward the body for the application of such pulling force, and said stem part including a weakened section of reduced cross-section adjacent said head for removal of the stem by fracture at said section after such expansion of the plug member in the opening, said weakened section remaining within the plug end after fracture of said weakened section.

2. In combination with a body having a passage which includes an outer end section and an internally threaded axial continuation section, an adjusting screw device having a radially expandable plug part disposed within the outer end section of the body passage and an extension threaded in the continuation section of the body passage, said plug part being in the form of a sleeve having a tapered inner surface, and an expander for the plug part slidably penetrating the same and being correspondingly tapered to radially expand such part when forced to move axially therewithin, the adjusting screw device being brought to a predetermined position threadably in the body passage and then locked in such position by operation of the expander to secure the plug part by expansion thereof in the end section of the passage.

3. An expansion plug device as set forth in claim 1, wherein the plug member has an opening in the end wall thereof through which the stem of the locking member in the assembly with the plug member extends for actuation.

4. An expansion plug device as set forth in claim 1, wherein the end wall of the plug member is imperforate, with the inner surface thereof tapered to have an outwardly decreasing diameter from the closed to the open end of the plug member.

5. An expansion plug device as set forth in claim 2, wherein the inner surface of the sleeve end section of the plug member is tapered so that the internal diameter of the section decreases from the closed to the open end thereof, and the locking member is pre-positioned within such section for relative outward pulling to accomplish the radial expansion of the section.

6. An expansion plug device as set forth in claim 5, wherein said locking member comprises a tapered head and an integral axial stem extending from the smaller end of the head of the member.

7. An expansion plug as set forth in claim 6, wherein the stem of the locking member has a weakened section adjacent the head adapted to fracture upon manipulation of the stem for detachment thereof after actuation to expand the sleeve section to locked condition in the opening.